Okimoto et al.

[19] United States Patent

[11] 4,403,051

[45] Sep. 6, 1983

[54] MICROCAPSULE DISPERSIONS

[75] Inventors: Tomoyuki Okimoto, Amagasaki; Shunsuke Shioi, Daito; Takio Kuroda, Amagasaki; Shigeo Okamoto, Suita; Tomoharu Shiozaki, Amagasaki, all of Japan

[73] Assignee: Kanzaki Paper Manufacturing Company, Limited, Japan

[21] Appl. No.: 157,537

[22] Filed: Jun. 9, 1980

[30] Foreign Application Priority Data

| | | | |
|---|---|---|---|
| Jun. 8, 1979 | [JP] | Japan | 54-72833 |
| Jul. 13, 1979 | [JP] | Japan | 54-89427 |
| Jul. 17, 1979 | [JP] | Japan | 54-91286 |

[51] Int. Cl.[3] .......... C08L 1/26; C09D 11/00; B01J 13/02

[52] U.S. Cl. .......... 524/45; 106/21; 252/315.3; 523/161; 523/202; 523/205

[58] Field of Search .......... 252/316; 106/21; 523/211; 524/503, 45

[56] References Cited

U.S. PATENT DOCUMENTS

| | | | |
|---|---|---|---|
| 3,257,267 | 6/1966 | Hay | 252/316 X |
| 3,565,753 | 2/1971 | Yurkowitz | 252/316 X |
| 3,585,149 | 6/1971 | Vassiliades et al. | 252/316 |
| 3,687,865 | 8/1972 | Katayama et al. | 252/316 |

OTHER PUBLICATIONS

Whistler et al.: Starch: Chemistry and Technology, vol. II, Industrial Aspects, Academic Press, New York, 1967, pp. 433–442.

*Primary Examiner*—Richard D. Lovering
*Attorney, Agent, or Firm*—Armstrong, Nikaido, Marmelstein & Kubovcik

[57] ABSTRACT

This invention concerns with an improved microcapsule dispersion prepared by adding the following components to a known microcapsule dispersion containing PVA; a pulp having a specific weighted average fiber length, another type of pulp, carboxymethyl cellulose and/or a specified periodic acid type compound, and is characterized by overcoming the drawbacks of known microcapsule dispersions attended by use of PVA.

5 Claims, No Drawings

MICROCAPSULE DISPERSIONS

This invention relates to microcapsule dispersions, and more particularly to microcapsule dispersions containing a polyvinyl alcohol (hereinafter referred to as "PVA").

Pressure sensitive manifold papers and heat sensitive manifold papers are widely used as record materials which utilize the principle that an electron donating organic chromogenic material and an electron accepting reactant material produce a color when coming into contact with each other. Pressure sensitive manifold paper is prepared with use of a microcapsule dispersions which contains at least one of the organic chromogenic material and the reactant material as enclosed in microcapsules and which has incorporated therein the other material as separated from the encapsulated material, such that when microcapsules are broken with application of pressure, the two components come into contact with each other to produce a color image.

With pressure sensitive manifold papers of the most typical type, the microcapsules contain an organic chromogenic material as dissolved or dispersed in a suitable oily material. At least one of animal oils, vegetable oils, mineral oils and synthetic oils is used as the oily material, while at least one of triarylmethane compounds, diphenylmethane compounds, xanthene compounds, thiazine compounds and spiro-compounds is usually used as the organic chromogenic material. An inorganic or organic acidic substance is used as the reactant material.

Pressure sensitive manifold papers are widely used for recording computer output and clerical and various other applications and should preferably have the characteristics required for the particular application contemplated. Accordingly microcapsule dispersions have incorporated therein various auxiliary materials for giving the desired characteristics. Finely divided pulp is used as one of such auxiliary materials for preventing coagulation of the microcapsule dispersion, rendering the dispersion applicable to paper without streaking, protecting the microcapsules, preventing the manifold paper from staining with ink, etc. PVA is useful as another auxiliary material. It is used as an emulsifier for the oily material, as a component of the material for forming the film of microcapsules or as a kind of adhesive.

PVA nevertheless has a drawback. When finely divided pulp is incorporated in a microcapsule dispersion in which PVA is used, the dispersion has an increased viscosity, with the possible result that microcapsules cohere with one another with particles of the pulp serving as nuclei, seriously impairing the applicability of the dispersion to substrate sheets.

The main object of this invention is to provide microcapsule dispersions containing both PVA and finely divided pulp as auxilary materials almost without involving an increase in viscosity.

The above object and other features of the invention will become apparent from the following description.

The object of the invention can be fulfilled by incorporating a finely divided pulp having a weighted average fiber length of up to 80 microns as measured by the method of TAPPI STD T232 SU-68 into a microcapsule dispersion containing PVA, or by incorporating a finely divided pulp and at least one of periodic acid, salts thereof and carboxymethyl cellulose (hereinafter referred to as "CMC") into the PVA-containing microcapsule dispersion.

Our research has revealed the following novel findings:

(i) When a finely divided pulp having a weighted average fiber length of up to 80 microns as measured by the method of TAPPI STD T232 SU-68 (the same as hereinafter) is incorporated into a microcapsule dispersion containing PVA as an emulsifier or as a component of the material for forming the film of microcapsules, the increase in the viscosity of the microcapsule dispersion can be greatly inhibited. In fact, the increase of the viscosity can be very effectively inhibited when the finely divided pulp is not larger than the limit of 80 microns in weighted average fiber length. The finely divided pulps heretofore used for microcapsule dispersions of the type described are all at least 85 microns in weighted average fiber length, and pulps with a shorter fiber length of up to 80 microns have never been used for the following reasons. Finely divided pulps are usually at least 85 to 90 microns in weighted average fiber length, and those of shorter fiber lengths must be prepared by a special procedure for shortening the fibers. Additionally it has been thought that when a finely divided pulp is admixed with a microcapsule dispersion, the adhesion of the dispersion of the substrate is more likely to reduce with a decrease in the fiber length of the pulp. For these two reasons, finely divided pulps smaller than 85 microns in fiber length have never been used for microcapsule dispersions of the above-mentioned type. However, we have found that when a finely divided pulp as short as up to 80 microns in weighted average fiber length is used, the reduction in the adhesion of the dispersion to the substrate is considerably smaller than is usually believed and that the use of the pulp produces the outstanding effect of inhibiting the rise of viscosity remarkably.

(ii) When a finely divided pulp of up to 80 microns in weighted average fiber length is used with PVA, the use of at least one of periodic acid, salts thereof and CMC conjointly therewith produces the synergic effect of inhibiting the increase of viscosity more remarkably and greatly remedies the reduction in the adhesion to the substrate.

(iii) The increase of the viscosity can be inhibited much more effectively than heretofore possible when at least one of periodic acid salts thereof and CMC is incorporated into a microcapsule dispersion containing PVA and a finely divided pulp even if the pulp is larger than 80 microns in weighted average fiber length (although the inhibitory effect is not as remarkable as when the fiber length is not larger than 80 microns). The inhibitory effect is especially remarkable in the case of microcapsule dispersion in which PVA is used as an emulsifier.

The present invention has been accomplished based on these novel findings.

The finely divided pulps to be used in this invention must be up to 80 microns in weighted average fiber length as measured by the method of TAPPI STD T232 SU-68 when none of periodic acid, salts thereof and CMC are used conjointly therewith. When larger than 80 microns in fiber length, the pulp is exceedingly less effective in inhibiting the rise of viscosity, whereas when smaller than 20 microns in fiber length, the pulp fails to act effectively as such and is not desirable.

The finely divided pulps to be used in combination with at least one of periodic acid, salts thereof and CMC are at least 20 microns in weighted average fiber length.

Finely divided pulps useful in this invention can be prepared by any method, for example, by mechanically pulverizing usual pulps to the desired fiber length, without or after having been hydrolyzed.

The amount of the finely divided pulp to be used in this invention, although variable with the amount of PVA contained in the microcapsule dispersion, is usually about 5 to about 45 parts by weight, preferably about 10 to about 35 parts by weight, per 100 parts by weight of the capsules.

According to this invention, the PVA contained in the microcapsule dispersion serves as an emulsifier, as a component of the material for forming the film of the capsules, or as an adhesive component. PVA is used as an emulsifier for oily materials, for example, in a process for preparing microcapsules by the polymerization of a polyisocyanate with water, polyamine or polyhydroxy compound (Published Examined Japanese Patent Applications No. 771/1967 and No. 13508/1977), or in a process for preparing microcapsules by the condensation of a polyamine with an acid chloride compound (U.S. Pat. No. 3,429,827). PVA is used as a component of materials for forming capsule films, for example, in a process in which capsules are prepared with use of gelation utilizing phase separation (Published Examined Japanese Patent Application No. 43547/1973). As an adhesive component, PVA is used, for example, in a process described in Published Unexamined Japanese Patent Application No. 89815/1979. Various PVA's are usable, and modified PVA's are also useful in which a few of the hydroxyl groups are replaced by such substituent groups as —COOH, —$NH_2$, —$CONH_2$ and —CN; however, the degree of modification or substitution should be restricted within a range which does not significantly change the fundametal nature of PVA itself. The amount of PVA to be present in the microcapsule dispersion varies with its function. For use as an emulsifier, it is about 0.5 to about 10 parts by weight, per 100 parts by weight of the capsules. For use as a component of the film forming material, it is about 5 to about 30 parts by weight, per 100 parts by weight of the capsules. For use as an adhesive component, it is about 1 to about 20 parts by weight, per 100 parts by weight of the capsules. In any event, the PVA as dissolved in the capsule dispersion is employed in a concentration of up to 7% by weight, preferably up to 5% by weight.

According to the invention, periodic acid and salts thereof are used. Examples of useful salts of periodic acid are alkali metal, alkaline earth metal and ammonium salts thereof. Among these, periodic acid, and alkali metal and ammonium salts thereof are preferable to use. More specific examples of preferred compounds are lithium periodate, sodium periodate, potassium periodate, cesium periodate, ammonium periodate, calcium periodate. Especially perferable to use are sodium periodate, potassium periodate and ammonium periodate. Periodic acid and salts thereof are used in an amount which is suitably determined in accordance with the kind and concentration of the microcapsule dispersion to be used and the amounts of PVA and pulp to be used. The amount is usually 0.0001 to 0.05 mole, preferably about 0.005 to about 0.01 mole, per liter of the dispersion. Use of a large excess of periodic acid and/or salts thereof is objectionable since such acid and salt, which are highly oxidative, are then likely to impair the film of capsules. Periodic acid and/or salts thereof are admixed with the capsule dispersion preferably after the capsules have been completely formed therein.

The CMC to be used in this invention has a viscosity of 2 to 500 centipoises as measured at 25° C. with a B-type viscosimeter (60 r.p.m., No. 1 rotor) when it is a 2% aqueous CMC solution and usually a relative low molecular weight. It is also preferable to use the CMC having a substitution degree of about 0.5 to about 1.5. The amount of CMC to be used is suitably determined in accordance with the molecular weight of CMC, the kind and amount of the microcapsule dispersion, and the amounts of PVA and pulp. The amount is usually more than 0.1 g preferably about 0.3 g to about 10 g, per liter of the dispersion to be used as a material of the invention.

A wide variety of microcapsule dispersions heretofore used are usable according to the invention. Examples of useful dispersions are those prepared by various known processes, such as coacervation process, interface polycondensation process, in-situ polycondensation process, etc., among which the interface polycondensation process is desirable in view of resistance to abrasive staining, printability, etc. Various organic chromogenic materials, reactant materials and capsule forming materials heretofore used are usable for the preparation of such dispersions. Examples of useful organic chromogenic materials are Crystal Violet lactone, 3,3-bis(p-dimethylaminophenyl)phthalide, 3-(p-dimethylaminophenyl)-3-(1,2-dimethylindole-3-yl)phthalide and like triarylmethane compounds; 4,4'-bis-dimethylaminobenzhydryl benzyl ether, N-halophenylleucoauramine, N-2,4,5-trichlorophenylleucoauramine and like diphenylmethane compounds; Rhodamine Anilino lactam, 3-diethylamino-7-chlorofluoran, 3-diethylamino-6,8-dimethylfluoran, 3,7-diethylaminofluoran, 3-diethylamino7-chloroethylmethylaminofluoran and like xanthene compounds; benzoyl leuco Methylene Blue, p-nitrobenzyl leuco Methylene Blue and like thiazine compounds; and 3-methylspiro-dinaphthopyran, 3-ethylspiro-dinaphthopyran, 3-proyl-spiro-dibenzopyran and like spiro-compounds. These compounds are used singly, or at least two of them are used in admixture. Useful reactant materials are those heretofore known and include inorganic acidic materials, such as acidic clay, activated clay, attapulgite, silica, zeolite, bentonite, aluminum silicate, etc.; and organic acidic materials, such as 4-tert-butylphenol, 2,2'-dihydroxydiphenol, 4,4'-isopropylidenediphenol and like phenolic compounds, phenolaldehyde polymers, phenol-acetylene polymers and like phenol polymers, benzoic acid, p-tert-butyl-benzoic acid, 4-methyl-3-nitro-benzoic acid, salicylic acid, 3-phenylsalicylic acid, 3-cyclohexyl salicylic acid, 3-tert-butyl- 5-methyl salicylic acid, 3,5-di-tert-butyl salicylic acid, 3-methyl-5-benzyl salicylic acid, 3-phenyl-5-($\alpha$,$\alpha$-dimethylbenzyl)salicylic acid, 3-cyclohexyl-5-$\alpha$,$\alpha$-dimethylbenzyl)salicylic acid, 3-($\alpha$,$\alpha$-dimethylbenzyl)-5-methyl salicylic acid, 3,5-di-cyclohexyl salicylic acid, 3,5-di-($\alpha$-methylbenzyl)salicylic acid, 3,5-di-($\alpha$,$\alpha$-dimethyl-benzyl)salicylic acid, 3-($\alpha$-methylbenzyl)-5-($\alpha$,$\alpha$-dimethylbenzyl)salicylic acid, 4-methyl-5-cyclohexyl salicylic acid, 2-hydroxy-1-benzyl-3-naphthoic acid, 1-benzoyl-b 2-hydroxy-3-naphthoic acid, 3-hydroxy-5-cyclohexyl-2-naphthoic acid and like aromatic carboxylic acids and polyvalent metal salts thereof, etc. Oily materials heretofore used are advantageously usable as such. Examples of useful oily materials are fish oil, lard and like animal oils, castor oil, soybean oil and like vegetable oils, kerosene, naphtha and like mineral oils, alkylated naphthalene, alkylated biphenyl, alkylated diphenylmethane and like synthetic oils.

The material for forming the film of capsules is not particularly limited; a wide variety of those heretofore known are usable, such as polymers of a polyisocyanate and water, polyamine or hydroxy compound, condensation products prepared from a polyamine and an acid chloride compound, etc. When polyisocyanates are used for forming microcapsules according to the invention, the increase of viscosity can be inhibited more effectively. Useful polyisocyanates are those heretofore known and include, for example, diisocyanates such as m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-4,4'-biphenyl diisocyanate, 3,3'-dimethyldiphenylmethane-4,4'-diisocyanate, xylylene-1,4-diisocyanate, xylylene-1,3-diisocyanate, 4,4'-diphenylpropane diisocyanate, trimethylene diisocyanate, hexamethylene diisocyanate, propylene-1,2-diisocyanate, butylene-1,2-diisocyanate, ethylidene diisocyanate, cyclohexylene 1,2-diisocyanate, cyclohexylene-1,4-diisocyanate, etc.; triisocyanates such as 4,4',4''-triphenylmethane triisocyanate, toluene-2,4,6-triisocyanate, etc.; and polyisocyanates such as 4,4'-dimethyldiphenylmethane-2,2',5,5'-tetraisocyanate. Also useful are addition products of such a polyisocyanate with a polyamine, polycarboxylic acid, polythiol, polyhydroxy compound, epoxy compound or like compound having a hydrophilic group. Useful polyamines for preparing such products are o-phenylenediamine, p-phenylenediamine, 1,5-diaminonaphthanlene, 1,3-propylenediamine, hexamethylenediamine, etc. Examples of useful polycarboxylic acids are pimelic acid, suberic acid, sebacic acid, phthalic acid, 4,4'-diphenyldicarboxylic acid, etc. Useful polyvalent thiols are illustrated by a condensation of thioglycol, a reaction product of polyhydric alcohol and thioether glycol, etc. Examples of useful polyhydroxy compounds are aliphatic or aromatic polyhydric alcohol, hydroxy polyester, hydroxy polyalkylene ether, etc. Examples of useful epoxy compounds are aliphatic or aromatic diglycidyl ester, aliphatic glycidyl ester, etc.

The microcapsule dispersions of the invention, although containing PVA and pulp as auxiliary materials, have very high stability in viscosity unlike conventional dispersions which are difficult to apply uniformly due to variations in viscosity and therefore require an additional procedure such as dilution and adjustment of coating conditions.

The invention will be described below in greater detail with reference to examples, in which parts and percentages are all by weight unless otherwise indicated.

EXAMPLE 1

An addition product (25 parts, trade mark "Coronate-L," product of Nippon Polyurethane Kogyo Co., Ltd., Japan) of tolylene diisocyanate and trimethylolpropane is dissolved in 100 parts of diisopropylnaphthalene (trade mark "K-113," product of Kureha Kagaku Co., Ltd., Japan) having dissolved therein 4 parts of Crystal Violet lactone. The resulting solution is emulsified in 400 parts of 5% aqueous solution of a polyvinyl alcohol (trade mark "PVA-117," product of Kuraray Co., Ltd., Japan) with use of a homomixer. The oily droplets in the emulsion and 7.8μ in mean particle size. The emulsion is heated to 80° C. while being stirred in a propeller mixer, reacted for 3 hours with continued stirring and then cooled to room temperature to effect complete capsulation.

Water (150 parts) is added to the capsule dispersion obtained, and 30 parts of a finely divided pulp 56 microns in weighted average fiber length is added to the mixture with stirring to prepare a capsule-containing coating composition. The composition has a viscosity of 11 cps as measured at 20° C. with a Brookfield viscometer immediately after preparation. To check the composition for stability in viscosity, a 500 ml portion of the composition is continuously stirred for 150 hours at 800 r.p.m. with a paddle mixer. The viscosity of the composition thereafter measured similarly is 18 cps. Thus the composition has very high stability in viscosity.

EXAMPLES 2–4 AND COMPARISON EXAMPLES 1 AND 2

Capsule-containing coating compositions are prepared in the same manner as in Example 1 with the exception of using finely divided pulps varying in weighted average fiber length as listed in Table 1. The compositions are tested for stability in viscosity in the same manner as in Example 1 except that they are stirred for the periods of time listed in Table 1. Table 1 also shows the results.

EXAMPLE 5

Acid-treated gelatin (50 parts) having an isoelectric point of 8.0 is added to 450 parts of water, and the mixture is allowed to stand at 10° C. for one hour and thereafter heated to 60° C. to obtain a solution Separately 4 parts of Crystal Violet lactone is dissolved in a mixture of 60 parts of kerosene and 140 parts of diisopropylnaphthalene, and the solution is heated to 60° C. and then added to the gelatin solution. The mixture is treated in a homomixer to prepare an emulsion containing oily droplets which are 5.1μ in mean size. While continuously stirring the emulsion with a propeller mixer at 4000 r.p.m., 650 parts of water having a temperature of 55° C. and 100 parts of 5% aqueous solution of CMC (160 in average polymerization degree and 0.6 in substitution degree) are added to the emulsion. A 10% aqueous solution of caustic soda is added to the mixture maintained at 50° C. to adjust the mixture to a pH of 5.5. While being stirred thoroughly and continuously, the system is allowed to cool to 10° C. The capsules thus formed are found to have a mean particle size of 5.3μ. Subsequently 10 parts of 50% aqueous solution of glutaraldehyde is added to the system which is maintained at 10° C. With addition of an aqueous solution of caustic soda, the system is adjusted to a pH of 7.0 to harden the capsules. The capsule dispersion obtained contains 18.5% of solids. A 10% aqueous solution (120 parts) of a polyvinyl alcohol (trade mark "PVA-217," product of Kuraray Co., Ltd., Japan) and 70 parts of finely divided pulp 56 microns in weighted average fiber length are added to the dispersion to prepare a capsule-containing coating composition, which is found to be 35 cps in viscosity. When stirred for 100 hours under the same conditions as in Example 1, the composition is found to have a viscosity of 43 cps.

EXAMPLE 6

A solution of 4 parts of Crystal Violet lactone in 60 parts of diisopropylnaphthalene prepared with heating is admixed with a solution of 10 parts of terephthaloyl chloride in 40 parts of diisopropylnaphthalene to obtain a solution. This solution is emulsified in 250 parts of 2% aqueous solution of a polyvinyl alcohol (trade mark "PVA-224," product of Kuraray Co., Ltd., Japan) with use of a homomixer to prepare an emulsion containing oily droplets which are 5.3μ in mean size. Diethylenetetramine (5.5 parts), 3.6 parts of sodium carbonate and 50 parts of water are added to the emulsion, and the mixture is stirred continuously at room temperature. The mixture is allowed to react for about 24 hours until the pH of the system becomes 8.0, when 200 parts of water is added to the system. While stirring the mixture, 30 parts of a finely divided pulp 72 microns in weighted average fiber length is added thereto to obtain a capsule-containing coating composition. The composition has a viscosity of 11 cps at 20° C., and a viscosity of 17 cps after having been stirred for 150 hours under the same conditions as in Example 1.

EXAMPLE 7

Acid-treated gelatin (25 parts, having an isoelectric point of 8) is added to 225 parts of water, and the mixture is allowed to stand for one hour. Subsequently 230 parts of water is further added to the mixture, and the resulting mixture is heated to 60° C. to obtain a solution. Separately 3 parts of Crystal Violet lactone and one part of benzoyl leuco Methylene Blue are dissolved in a mixture of 30 parts of kerosene and 70 parts of diphenyl chloride, and the solution is heated to 60° C. and thereafter admixed with the gelatin solution to obtain an emulsion containing oily droplets which are 4.5μ in mean size. The emulsion is adjusted to a pH of about 7.

When 200 parts of 15% aqueous solution of a polyvinyl alcohol (trade mark "PVA-117," product of Kuraray Co., Ltd., Japan) is added to the emulsion with stirring, phase separation occurs. The system is thereafter rapidly cooled. With addition of water to prevent an increase of viscosity by dilution, the system is cooled to a temperature of not higher than 12° C. Subsequently 25 parts of 10% aqueous solution of formalin is added to the system. The system is adjusted to a pH of 10.6 with 10% aqueous solution of caustic soda.

A capsule-containing coating composition is prepared by adding 150 parts of water and 30 parts of a finely divided pulp 72 microns in weighted average fiber length to the capsule dispersion obtained and uniformly stirring the mixture. The composition has a viscosity of 14 cps of 20° C., and a viscosity of 23 cps after having been stirred for 150 hours under the same conditions as in Example 1.

COMPARISON EXAMPLE 3

A capsule-containing coating composition is prepared in the same manner as in Example 7 except that the finely divided pulp used is 92 microns in weighted average fiber length. The composition is tested for stability in viscosity with the result shown in Table 1.

TABLE 1

| | Capsule forming material | Fiber length of pulp (μ)* | Viscosity of capsule dispersion (20° C., cps): Immediately after preparation | After stirring | (Duration of stirring (hours)) |
|---|---|---|---|---|---|
| Ex. 1 | Isocyanate | 56 | 11 | 18 | 150 |
| Ex. 2 | " | 72 | 14 | 20 | 100 |
| Ex. 3 | " | 49 | 14 | 22 | 150 |
| Ex. 4 | " | 35 | 10 | 13 | 150 |
| Ex. 5 | Gelatin | 56 | 35 | 43 | 100 |
| Ex. 6 | Polyamide | 72 | 11 | 17 | 150 |
| Ex. 7 | Gelatin.PVA | 72 | 14 | 23 | 150 |
| Comp. Ex. 1 | Isocyanate | 85 | 14 | 100 | 50 |
| Comp. Ex. 2 | " | 92 | 15 | 130 | 22 |
| Comp. Ex. 3 | Gelatin.PVA | 92 | 15 | 146 | 22 |

*Weighted average fiber length.

Table 1 shows that the above examples of the invention afford capsule-containing coating compositions which remain highly stable almost free to the rise of viscosity even after having been stirred for a prolonged period of time. It is seen that the coating compositions obtained in the foregoing comparison examples have very poor viscosity stability, exhibiting a marked increase in viscosity when stirred for a short period of time.

EXAMPLE 8

An addition product (25 parts, trade mark "Coronate-L," product of Nippon Polyurethane Kogyo Co., Ltd., Japan) of tolylene diisocyanate and trimethylolpropane is dissolved in 100 parts of diisopropylnaphthalene (trade mark "K-113," product of Kureha Kagaku Co., Ltd., Japan) having dissolved therein 4 parts of Crystal Violet lactone. The resulting solution is emulsified in 400 parts of 5% aqueous solution of a polyvinyl alcohol (trade mark "PVA-117," product of Kuraray Co., Ltd., Japan) with use of a homomixer. The oily droplets in the emulsion are 7.8μ in mean particle size. The emulsion is heated to 80° C. while being stirred in a propeller mixer, reacted for 3 hours with continued stirring and then cooled to room temperature to effect complete capsulation.

Water (140 parts) and 10 parts of 2% aqueous solution of CMC (12 cps in viscosity at 25° C. and 0.75 in substitution degree) are added to the capsule dispersion obtained, and 30 parts of a finely divided pulp (trade mark, "KC-FLOCK W-300," product of Sanyo-Kokusaku Pulp Co., Ltd., Japan) is added to the mixture with stirring to prepare a capsule-containing coating composition. The composition has a viscosity of 18 cps as measured at 20° C. with a Brookfield viscometer immediately after preparation. To check the composition for stability in viscosity, a 500 ml portion of the composition is continuously stirred for 100 hours at 800 r.p.m. with a paddle mixer. The viscosity of the composition thereafter measured is 32 cps. Thus the composition has very high stability in viscosity.

EXAMPLE 9

To the capsule dispersion prepared in the same manner as in Example 8 are added 30 parts of 2% aqueous solution of CMC [illegible] in substitution degree) and 120 parts of water and 25 parts of a pulp (trade mark, "KC-FLOCK W-250," [illegible] Japan) are [illegible] The composition [illegible] composition is tested for stability in viscosity in the same manner as in Example 8. The results are 14 cps [illegible] (immediately [illegible] ring).

[illegible] composition has very high stability in viscosity.

EXAMPLE 10

To the capsule dispersion prepared in the same manner as in Example 8 are added [illegible] 2% aqueous solution and [illegible] in substitution degree) [illegible] and 140 parts of water and 28 parts of pulp (trade mark, "KC-FLOCK [illegible] product of Sanyo-Kokusaku Pulp Co., Ltd., Japan) is added to the mixture with stirring to prepare a capsule-containing coating composition. The composition is checked for stability in viscosity in the same manner as in Example 8. The results are 25 cps and 31 cps.

[illegible] checked for stability in viscosity in the same manner as in Example [illegible]

EXAMPLE 11

50 Parts of diisopropylnaphthalene having dissolved therein 10 parts of terephthaloylchloride is added to 64 parts of diisopropylnaphthalene having dissolved therein 4 parts of Crystal Violet Lactone. The resulting mixture is emulsified in 250 parts of 2% aqueous solution of PVA (trade mark, "PVA-117," product of Kuraray Co., Ltd., Japan) with use of a homomixer. The droplets in the emulsion are 5.3μ in mean particle size. To the emulsion are added 5.5 parts of diethylenetetramine, 3.6 parts of sodium carbonate and 50 parts of water and the resulting mixture is stirred at room temperature and reacted for 24 hours to a pH of 8.0 to produce a capsule dispersion. Water (120 parts) and 60 parts of 2% aqueous solution of CMC (6 cps in viscosity at 25° C. and 0.7 in substitution degree) are added to the capsule dispersion and 30 parts of a pulp (trade mark, "KC-FLOCK W-300," product of Sanyo-Kokusaku Pulp Co., Ltd., Japan) is added to the mixture to prepare a capsule-containing coating composition. The composition is tested for stability in viscosity in the same manner as in Example 8. The results are 18 cps (immediately after preparation) and 33 cps (after stirring).

COMPARISON EXAMPLE 4

A capsule-containing coating composition is prepared in the same manner as in Example 8 with the exception of using CMC. The composition is 14 cps in viscosity. The composition is tested for stability in viscosity in the same manner as in Example 8. The results are 100 cps (after 50 hours) and 210 cps (after 100 hours).

COMPARISON EXAMPLE 5

A capsule-containing coating composition is prepared in the same manner as Example 11 with exception of using CMC. The composition has a viscosity of 14 cps. The composition is checked for stability in viscosity in the same manner as in Example 8. The results are 420 cps (after 2 hours).

EXAMPLE 12

A capsule dispersion is prepared in the same manner as in Example 1 and 150 parts of water and 0.6 part of periodic acid ($HIO_4.2H_2O$) are added to the dispersion.

EXAMPLE 13

[illegible]

EXAMPLE 14

A capsule dispersion is prepared in the same manner as in Example 11. To the dispersion are added 200 parts of water and 0.6 part of potassium periodate and then 30 parts of pulp (trade mark, "KC-FLOCK W-300", product of Sanyo-Kokusaku Pulp Co., Ltd., Japan) is added to the resulting mixture with stirring to produce a capsule-containing coating composition. The composition is checked for viscosity in the same manner as in Example 12. The results are 10 cps (after preparation) and 15 cps (after 150 hours).

We claim:

1. In an aqueous microcapsule dispersion used for preparing pressure sensitive manifold papers, said dispersion containing auxiliary materials of a polyvinyl alcohol and pulp, the improvement comprising said pulp being present in an amount of about 5 to about 45 parts by weight per 100 parts by weight of the capsules and being a finely divided pulp up to 80μ in weighted average fiber length, so as to substantially inhibit an increase in viscosity of said dispersion.

2. An aqueous microcapsule dispersion as defined by claim 1, wherein the dispersion further contains at least one compound selected from the group consisting of periodic acid or a salt thereof, each in an amount of 0.001 to 0.05 mole/l, and carboxymethyl cellulose in an amount of 0.1 to 10 g/l.

3. In an aqueous microcapsule dispersion used for preparing pressure sensitive manifold papers, said dispersion containing auxiliary materials of a polyvinyl alcohol and pulp, the improvement comprising said pulp being present in an amount of about 5 to about 45 parts by weight per 100 parts by weight of the capsules and being a finely divided pulp not less than 20μ in weighted average fiber length, and said dispersion further containing at least one compound selected from the group consisting of periodic acid or a salt thereof, each in an amount of 0.001 to 0.05 mole/l, and carboxymethyl cellulose in an amount of 0.1 to 10 g/l, so as to substantially inhibit the increase in viscosity of said dispersion.

4. An aqueous microcapsule dispersion as defined by claim 3, wherein the dispersion contains periodic acid or a salt thereof and carboxymethyl cellulose.

5. An aqueous microcapsule dispersion as defined by claim 3, wherein the dispersion contains periodic acid or a salt thereof.

* * * * *